United States Patent [19]
Sowerby

[11] Patent Number: 5,872,351
[45] Date of Patent: Feb. 16, 1999

[54] DOMED INDUCTION OVEN

[75] Inventor: John C. Sowerby, McKinney, Tex.

[73] Assignee: Taco Bell Corporation, Irvine, Calif.

[21] Appl. No.: 770,820

[22] Filed: Dec. 20, 1996

[51] Int. Cl.$^6$ ........................................... H05B 6/12
[52] U.S. Cl. .................. 219/621; 219/622; 219/624; 99/DIG. 14
[58] Field of Search ..................... 219/621, 622, 219/623, 624, 647, 601, 756; 99/DIG. 14

[56] References Cited

U.S. PATENT DOCUMENTS

| | | |
|---|---|---|
| 400,978 | 4/1889 | Watts . |
| 2,000,413 | 7/1935 | Myers . |
| 2,908,234 | 10/1959 | Naylor . |
| 2,942,562 | 6/1960 | Luc . |
| 2,956,144 | 10/1960 | Woodman ............................... 219/765 |
| 3,419,698 | 12/1968 | Palmero et al. . |
| 3,790,735 | 2/1974 | Peters, Jr. . |
| 4,002,875 | 1/1977 | Kiuchi et al. . |
| 4,108,138 | 8/1978 | Petin et al. . |
| 4,110,587 | 8/1978 | Souder, Jr. et al. . |
| 4,565,571 | 1/1986 | Abbaschian ................................ 419/2 |
| 5,135,128 | 8/1992 | Kuhn ........................................ 220/318 |
| 5,144,105 | 9/1992 | Briggs et al. ............................ 219/732 |
| 5,177,333 | 1/1993 | Ogasawara . |
| 5,315,922 | 5/1994 | Keller . |

FOREIGN PATENT DOCUMENTS

| | | | |
|---|---|---|---|
| 61-272524 | 12/1986 | Japan ...................................... 219/624 |
| 1741293 | 6/1992 | U.S.S.R. ................................. 219/624 |

*Primary Examiner*—Philip H. Leung
*Attorney, Agent, or Firm*—Knobbe, Martens, Olson & Bear, LLP

[57] ABSTRACT

A domed-shaped oven relies on induction technology to provide heat. In particular, the oven has a dome or igloo shape, preferably modeled as an Italian dome oven, for use in a commercial pizza facility. The dome is made of a heat conducting and holding material such as concrete or stone. In the bottom of the oven, a magnetically susceptible plate is interposed between two layers of concrete. Beneath the lower layer of concrete, an induction coil provides the energy necessary to inductively heat the plate sandwiched between the concrete layers. In alternative embodiments of the present invention, additional plates are interposed between layers of concrete throughout the dome. Additional induction coils are provided proximate each of those plates.

13 Claims, 2 Drawing Sheets

## DOMED INDUCTION OVEN

BACKGROUND OF THE INVENTION

1. Field of the Invention

The present invention relates to induction cooking ovens, and more specifically to dome-shaped induction ovens wherein an induction coil heats a metal plate embedded in the floor or dome of the oven.

2. Description of Related Art

Many restaurants currently use wood burning ovens to cook pizza and other food items. These ovens are typically dome-shaped, like an igloo, are made of concrete or stone, and burn wood as a heat source. The same ovens are also typically available using gas heat under the base or inside the oven. Although gas is used as a primary heat source in these ovens, wood is often burned to flavor the food.

Although the use of wood burning ovens produces positive results in food flavoring, there are many disadvantages to a wood burning oven and also to a wood burning oven in combination with gas heat. One concern is that all available oxygen in the oven could possibly be used to burn the wood and that the gas flame would extinguish due to the lack of oxygen. In this environment, the gas would continue to flow into the oven and, after a sufficient amount of gas has accumulated, a subsequent ignition of the gas could result in an explosion. In addition, in a wood burning oven or in a wood burning oven with a gas flame, the fire source takes up cooking space and certain areas close to the heating source are not usable for cooking. In addition, it is difficult to precisely control the temperature of a wood burning oven. Although it may be desired to have an oven with different locations being heated to different temperatures, this is difficult in the wood burning oven environment. Additionally, in some areas, building code requirements prohibit the use of wood burning ovens. In these areas, restaurant owners are limited to gas-fired ovens, but in some cases are allowed to burn a limited amount of wood to flavor the food.

The use of induction heating to cook food is widely known and has been used for many years. In current induction technology, a magnetic field is created and the cooking vessel becomes the receiver in the magnetic circuit. The magnetic field causes the bottom of the cooking vessel to heat rapidly. Control of the magnetic field allows very accurate adjustment of the speed and intensity of the heat. However, for successful operation, the cooking vessel, pot or pan must have sufficient magnetic susceptibility. This limits the use of cookware for use with induction technology to pots or pans constructed of stainless steel, cast iron pans or the like. The use of inductive technology in ovens has been described in various U.S. patents, including U.S. Pat. No. 3,790,735 issued Feb. 5, 1974 to Peters, Jr. and U.S. Pat. No. 400,978 issued Apr. 9, 1889 to H. F. Watts.

In the Watts patent, a basic induction oven is described. In this embodiment, plates with magnetic susceptibility are placed in close proximity to induction coils. These plates can form either the walls of an oven or a bottom of a cooking vessel. As alternating current is generated through the induction coils to create the magnetic field, and the temperature of the plates rises rapidly. Because the plates comprise the walls of the oven or the base of the cooking vessel, this heat is then transferred to the item to be cooked. The Watts patent discloses the basics of induction cooking; however, it is limited either to ovens constructed of a magnetically susceptible metal, or to magnetically susceptible pans or cooking vessels.

The Peters, Jr., patent discloses an improved induction heated oven wherein all the walls of the oven are heated using induction technology. By heating all of the walls or sides of the oven cavity, the oven cavity is heated uniformly in a minimum time period. However, the walls or sides of the oven cavity must still be manufactured from a metal having magnetic susceptibility. The Peters, Jr., patent does suggest the use of an insulated oven cavity, but in this embodiment, a metal-based cooking utensil in which the food is placed and which can be magnetically heated must be used.

What is needed is an oven capable of exploiting the conventional technology without being limited to the inner surfaces of the oven cavity or the cooking utensil being made of a metal-based material having magnetic susceptibility. It is also desirable to burn a small amount of wood to thereby impart additional flavoring on the food. It is further desirable to include several induction plates so as to maintain differing temperature zones throughout the oven.

SUMMARY OF THE INVENTION

The present invention relates to a domed-shaped oven that relies on induction technology to provide heat. In particular, the present oven has a dome or igloo shape, preferably modeled as an Italian dome oven, for use in a commercial pizza facility. The dome is made of an insulated material such as concrete or stone. In the bottom of the oven, a steel plate is interposed between two layers of concrete. Beneath the lower layer of concrete, an induction coil is used to provide the energy necessary to heat the steel plate sandwiched between the concrete layers. In alternative embodiments of the present invention, additional steel plates are interposed between layers of concrete throughout the dome. Additional induction coils are provided proximate to each of those plates.

In an additional embodiment of the present invention, an inductively heated bake oven for heating and cooking food comprises a flat bottom surface comprising primarily a nonmetallic material and a dome-shaped top attached to the bottom surface at an outer rim of the dome such that an enclosed space is formed between the dome-shaped top and the flat bottom surface. An opening exists in one portion of the domed surface for inserting and removing food. A first metal plate comprising a magnetically susceptible material is in contact with the flat bottom surface. An induction heating coil is located in close proximity to the metal plate such that when an alternating electric current is passed through the induction heating coil, a magnetic inductive coupling between the heating coil and the metal plate causes heating of the metal plate. The inductively heated bake may have the bottom surface and the dome-shaped top primarily made of an insulating material. Additionally, the first metal plate may be sandwiched between two layers of insulating, nonmetallic material.

In another embodiment of the present invention, the dome-shaped top is placed in contact with a second metal surface comprising a magnetically susceptible material magnetically coupled to a second set of induction coils.

A further embodiment of the present invention is a method of using an induction oven to heat food, the method comprising the steps of placing food in a cavity between a domed top and a flat bottom; running a relatively high frequency alternating current though an induction heating coil to thereby magnetically inducing the generation of skin-effect heating in a metal plate located in close proximity to said flat bottom; diffusing heat from the metal plate by transferring the heat to an insulating surface; heating the food by conduction heat from the insulating surface; and removing the food after a predetermined period of time from the cavity. The method can include the additional step of burning wood within the cavity to provide flavoring for the food.

Another embodiment of the present invention is an inductively heated bake oven for heating and cooking food, the oven comprising a bottom having an inner surface and an outer surface where the inner surface of the bottom is made of an insulating material. A plurality of sides are joined to the bottom at a joint such that an oven cavity is formed by the different sides and the inner surface of the bottom. An opening is included in the plurality of sides for the insertion of food. A magnetic plate is positioned in contact with the outer surface of the bottom. An induction coil is magnetically coupled to the magnetic plate, and a circuit inputs an alternating current into the induction coil.

DETAILED DESCRIPTION OF THE PREFERRED EMBODIMENT

Figure 1:
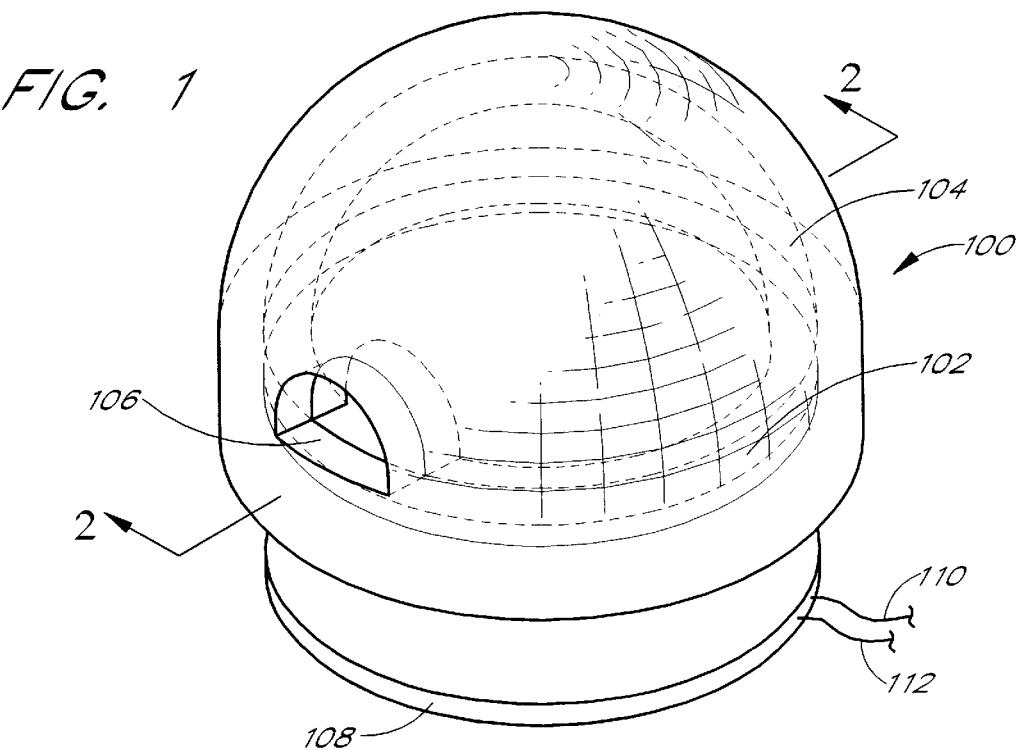
FIG. 1 is a perspective view of the dome shaped induction oven of the preferred embodiment of the present invention.

FIG. 1 is a perspective view of one embodiment of a domed induction oven 100 of the present invention. The domed induction oven 100 comprises a dome 104 resting on top of a base 102. The dome 104 and the base 102 are made of a heat conducting and holding material such as concrete or stone. The dome 104 has a generally hemispherical shape. In order to place items inside the dome to be cooked in the oven, an arch-shaped opening 106 is formed in the wall of the dome 104. The opening 106 extends from the surface of the base 102 partway up the dome 104, but not all the way to the top of the dome 104.

To provide heat for the domed induction oven 100, a planar base induction heating coil 108 is provided beneath the base 102. Induction heating coils suitable for use in the present invention are generally known in the art. The coil 108 is provided AC power via electrical lines 110, 112.

Figure 2:
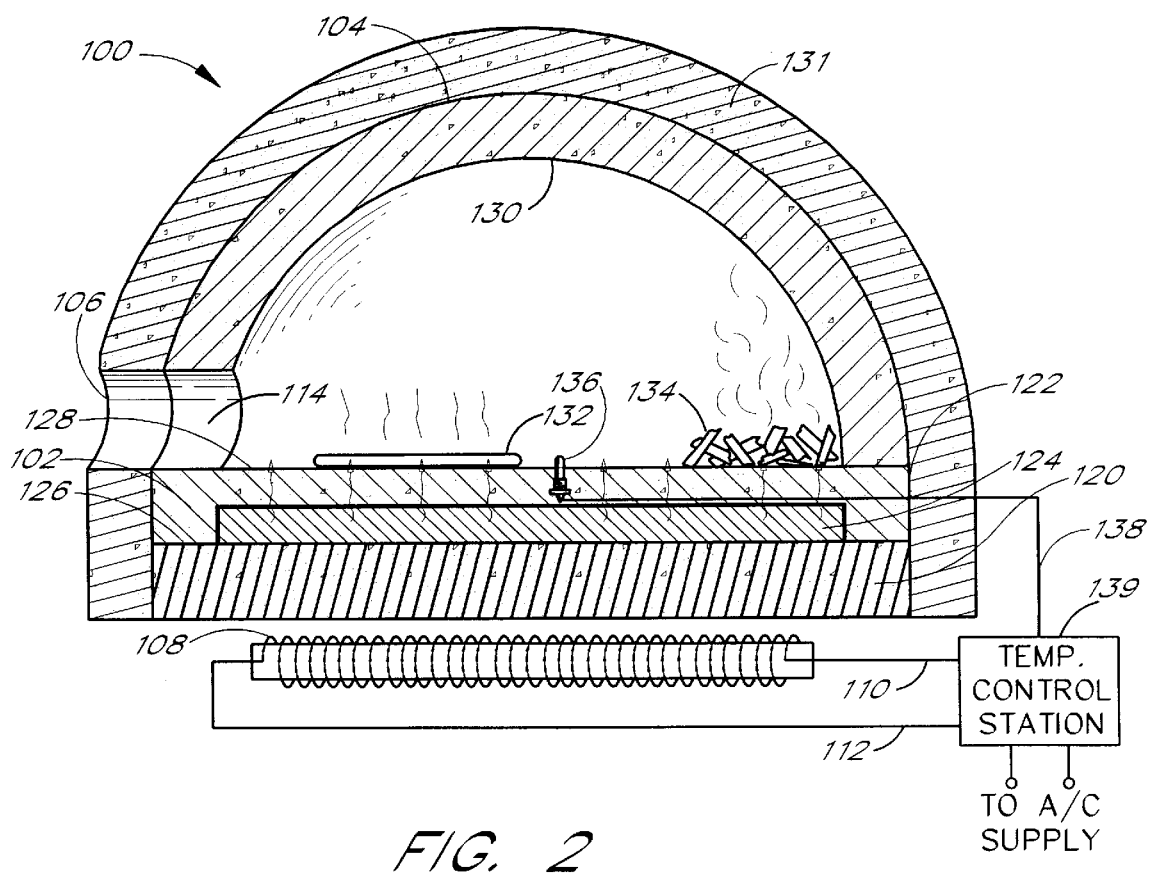
FIG. 2 is a detailed cut-away front plan view of the induction oven of the preferred embodiment of FIG. 1.

FIG. 2 illustrates the features of the domed induction oven 100 in more detail. The base 102 is formed from a first section 120 and a second section 122. A base heating plate 124 is sandwiched between the first section 120 and the second section 122 of the base 102. During construction of the domed induction oven 100, the first section 120 of the base 102 is formed from concrete, stone, or any other suitable material. The base heating plate 124 is then placed on a top side 126 of the first section 120 of the base 102. In the preferred embodiment, the base heating plate is a single, pancake-shaped planar metal plate. The base heating plate 124 may be made of any suitable ferrous alloy, such as stainless steel, iron, porcelainized steel, titanium, or any other like material. The main requirement is that the metal be magnetically susceptible to induction heating. When the base heating plate 124 is in place, the second section 122 of the base 102 is formed around and on top of the base heating plate 124. In the preferred embodiment, both the first section 120 and the second section 122 of the base 102 are formed from concrete. Because of the concrete construction, the second section 122 of the base 102 can be formed by pouring concrete around the base heating plate 124 and then allowing the concrete to set. When in place, the top of the second section 122 forms the cooking surface 128 upon which an item to be baked, such as a pizza 132, can be placed.

The dome 104 is placed on top of the base 102. The dome 104 can be constructed of concrete, stone, or other heat conducting and holding material using techniques well known in the art. One such technique is shown in U.S. Pat. No. 4,108,138, issued to Petin, et al., which is hereby incorporated by reference herein. When the dome 104 is placed on the base 102, an enclosed cooking area is created between the cooking surface 128 and the interior of the dome 130. Surrounding the dome 104 is an insulating layer 131.

The domed induction oven 100 is heated using the combination of the base heating coil 108 and the base heating plate 124. Using induction technology, an AC voltage is applied to the base heating coil 108 via the electrical lines 110 and 112. The AC voltage applied across the coil 108 generates a magnetic field around the coil 108. This magnetic field surrounds the base heating plate 124, causing the temperature of the base heating plate 124 to rise rapidly in a known manner. The heat from the base heating plate 124 is then transferred through the second section 122 to heat the cooking surface 128 of the domed induction oven 100. The heat from the plate 124 is then diffused through the insulating concrete section 122 to more evenly distribute the heat in the oven cavity than if the plate 124 was exposed. Some of the heat produced from the base heating plate 124 heats the cooking surface 128 directly and additional heat radiates to the dome 104 where the heat is reflected back into the oven cavity by the interior side of the dome 130 to add to the heat received by the cooking surface 128.

To add the desired flavoring to the food to be cooked, a small amount of wood 134 can be placed on the cooking surface 128 and ignited in a conventional manner to provide additional flavoring. The oven 100 will vent cooking smells and by-products of the burning wood through the door 106.

A temperature sensor 136 is advantageously mounted in the base 102 to monitor the temperature inside the dome 104 and to provide a responsive electrical signal on a line 138 connected to a temperature control station 139. The control station 139 adjusts the AC voltage applied to the base heating coil 108 to maintain the desired temperature inside the dome 104. Preferably, the sensor 136 is positioned proximate the cooking area as shown. Of course, multiple sensors 136 may be placed throughout the base 102 for more accurate temperature control of the various portions of the oven interior.

Although the dome 104 is shown as a perfect hemisphere, the walls of the dome 104 may extend straight up several inches from the top of the base 102 before curving over to form the upper part of the dome. In a preferred embodiment, the dome 104 has an internal diameter of four to seven feet, and the dome wall has a thickness of four inches. In one embodiment, the maximum height from the cooking surface 128 to the interior dome wall 130 is thirty-six inches. The base 102 is approximately five feet in diameter and has a thickness of six inches. In this embodiment, the base heating plate has a diameter of four feet, six inches. All of these dimensions are to be considered merely as illustrative of one preferred embodiment of the present invention and not as a limitation to the scope of the invention.

Figure 3:
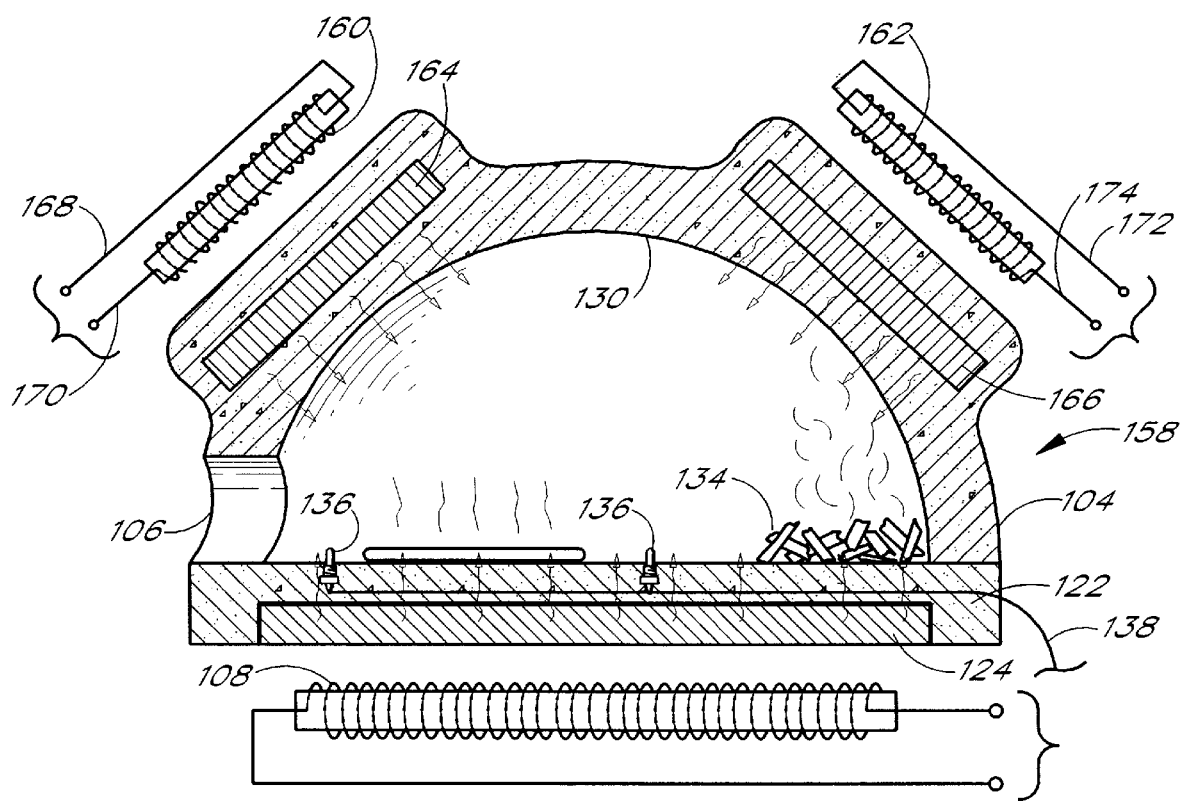
FIG. 3 is a cut-away front plan view of an alternate embodiment of the induction oven of the present invention.

A further alternative embodiment of the present invention is shown in FIG. 3. In this embodiment, additional heating plates are used to further define the temperature at which an oven 158 is kept. As shown in FIG. 3, dome heating plates 164 and 166 are inserted into the walls of the dome 104 of the induction oven 158. The dome heating plates 164, 166 are generally smaller than the base heating plate 124. Each dome heating plate 164, 166 has a respective heating coil 160, 162. The coils 160, 162 are connected to an AC voltage via a temperature control station 139 (FIG. 2) and electrical lines 168, 170, 172 and 174 as discussed above. In the embodiment of FIG. 4, the temperature control station 139 advantageously provides independent control of the coils 108, 160 and 162.

In operation, temperature control of the oven 158 of FIG. 3 can be maintained precisely using the combination of the base heating plate 124 and the dome heating plates 164, 166. In addition to the heat radiating from the base heating plate 124 and being reflected off the interior dome wall 130, heat is directly transmitted from the dome heating plates 164, 166. The door 106 allows ventilation of the oven 158. The temperature sensors 136 detect the temperature in the cooking area of the oven 158 and transmit this information along signal lines 138. The temperature control station 139 (FIG. 2) then adjusts the amount of power sent to each heating coil 160, 162 and 108 to maintain the desired temperature in the oven 158. Of course, with multiple temperature sensors 136 placed throughout the oven 158, different portions of the oven 158 can be maintained at different temperatures. This is advantageous when cooking differing types of food which require different baking temperatures and times.

Although the embodiment shown in FIG. 3 contains one base heating plate 124 and two dome heating plates 164, 166, it will be appreciated that the present invention can be practiced using multiple heating plates and multiple or no dome heating plates. The number and size of heating plates used will not alter the spirit of the invention.

Numerous variations and modifications of the invention will become readily apparent to those skilled in the art. Accordingly, the invention may be embodied in other specific forms without departing from its spirit or essential characteristics. The detailed embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. An inductively heated bake oven for heating and cooking food, said bake oven comprising:
    a floor having a generally flat surface and a thickness, said floor comprising a nonmetallic material;
    a dome-shaped top attached to said bottom surface at an outer rim of said dome such that an enclosed space is formed between said dome-shaped top and said flat surface;
    an opening in one portion of said domed surface, said opening sized for inserting and removing food;
    a first metal plate comprising a magnetically susceptible material embedded in said thickness of said floor; and
    an induction heating coil located in close proximity with said metal plate such that when an alternating electric current is passed through said induction heating coil, magnetic inductive coupling between said heating coil and said metal plate causes heating of said metal plate, the heat diffusing through the floor thereby heating food in said enclosed space.

2. The inductively heated bake oven of claim 1, wherein said floor and said dome-shaped top primarily comprise a heat conducting and holding material.

3. The inductively heated bake oven of claim 2, wherein said first metal plate is sandwiched between two layers of nonmetallic heat transfer material.

4. The inductively heated bake oven of claim 2, wherein said dome-shaped top is placed in contact with a second metal surface comprising a magnetically susceptible material, said second metal surface magnetically coupled to a second set of induction coils.

5. A method of using an inductive oven to heat food, said method comprising the steps of:
    placing food in a cavity between a domed top and a nonmetallic flat bottom;
    running a relatively high frequency alternating current though an induction heating coil to magnetically induce the generation of skin-effect heating in a metal plate located in close proximity to said nonmetallic flat bottom;
    diffusing heat from said metal plate by transferring said heat through a heat conducting medium to said cavity;
    heating said food by heat conducting from said conducting surface; and
    removing said food after a predetermined period of time from said cavity.

6. The method of using an inductive oven to heat food defined in claim 5, wherein said method includes the additional step of burning wood within said cavity to provide flavoring for said food.

7. An inductively heated bake oven for heating and cooking food, said bake oven comprising:
    a bottom having an inner surface and an outer surface, said inner surface of said bottom comprising a nonmetallic conducting material for diffusing heat;
    a plurality of sides joined to said bottom such that an oven cavity is formed by said sides and said inner surface of said bottom;
    an opening in one of said sides for the insertion of food;
    a magnetic plate in contact with said outer surface of said bottom;
    an induction coil magnetically coupled to said magnetic plate; and
    conductors for providing an alternating current into said induction coil.

8. The inductively heated bake oven of claim 7, wherein said outer surface of said bottom comprises a conducting material, said outer surface of said bottom further being enveloped by an insulating shell bottom such that said metal plate is sandwiched between said outer surface of said bottom and said insulating shell bottom.

9. The inductively heated bake oven of claim 7, wherein said sides joins said bottom along an arcuate perimeter of said bottom.

10. The inductively heated bake oven of claim 7, wherein said plurality of sides forms a dome shape above said inner surface of said bottom.

11. The inductively heated bake oven of claim 7, wherein said plurality of sides forms an inner surface and an outer surface, said inner surface of said plurality of sides comprising a heat conducting material.

12. The inductively heated bake oven of claim 11, wherein said outer surface of said plurality of sides is in contact with a second magnetic surface, said second magnetic surface magnetically coupled to a second induction coil.

13. The inductively heated bake oven of claim 11, wherein said plurality of sides forms a dome shape above said inner surface of said bottom.

* * * * *